(12) United States Patent
Rockelmann et al.

(10) Patent No.: US 8,690,234 B2
(45) Date of Patent: Apr. 8, 2014

(54) VEHICLE ROLLER BLIND ARRANGEMENT, SUBASSEMBLY WITH A VEHICLE ROLLER BLIND ARRANGEMENT, AND ROOF ARRANGEMENT

(75) Inventors: Andreas Rockelmann, München (DE);
Martin Pollak, Puchheim (DE);
Dominik Hoelzel, Groebenzell (DE);
Erwin Steiner, Weilheim (DE); Tobias Nowack, Munich (DE); Ulrike Bruggaier, Oberhaching (DE); Susanne Schandel, Munich (DE); Manfred Faerber, Wienlenbach (DE)

(73) Assignee: Webasto SE, Stockdorf (DE)

( * ) Notice: Subject to any disclaimer, the term of this patent is extended or adjusted under 35 U.S.C. 154(b) by 0 days.

(21) Appl. No.: 13/320,892

(22) PCT Filed: Apr. 21, 2011

(86) PCT No.: PCT/EP2011/056439
§ 371 (c)(1),
(2), (4) Date: Feb. 2, 2012

(87) PCT Pub. No.: WO2011/134894
PCT Pub. Date: Nov. 3, 2011

(65) Prior Publication Data
US 2013/0038092 A1    Feb. 14, 2013

(30) Foreign Application Priority Data

Apr. 26, 2010 (DE) .......................... 10 2010 018 259

(51) Int. Cl.
*B60J 3/02*    (2006.01)
*B60J 7/00*    (2006.01)
(52) U.S. Cl.
USPC .......................................................... 296/214

(58) Field of Classification Search
USPC ............................................................ 296/214
See application file for complete search history.

(56) References Cited

U.S. PATENT DOCUMENTS 3,116,097 A    12/1963   Novales
6,167,936 B1*  1/2001   Stover et al. .................... 160/27
(Continued)

FOREIGN PATENT DOCUMENTS

CN    101102913 A    1/2008
CN    101260780 A    9/2008
(Continued)

OTHER PUBLICATIONS

International Search Report for PCT/EP2011/056439 dated Jul. 29, 2011.

(Continued)

*Primary Examiner* — Dennis Pedder
(74) *Attorney, Agent, or Firm* — Marshall, Gerstein & Borun LLP

(57) ABSTRACT

A vehicle roller blind arrangement, with a roller blind web that can be wound or unwound in an extension direction, a band-shaped guide element that extends along the extension direction and is guidable in a guide rail, which can be coupled fixedly to a vehicle, in such a manner that said guide element extends parallel to the roller blind web, and a band element that extends along the extension direction and is arranged between the roller blind web and the guide element and, on a first longitudinal side, is coupled fixedly to the roller blind web and, on a second longitudinal side, is coupled fixedly to the guide element. The band element has a T-shaped or Y-shaped cross section, is formed of a different material from the roller blind web, and has a smaller material thickness than the roller blind web. In addition, the invention relates to correspondingly configured subassemblies and roof arrangements.

6 Claims, 3 Drawing Sheets

(56) References Cited

U.S. PATENT DOCUMENTS

| | | |
|---|---|---|
| 7,793,702 B2 | 9/2010 | Biewer et al. |
| 7,950,440 B2 | 5/2011 | Rockelmann et al. |
| 2006/0027347 A1 | 2/2006 | Boehm et al. |
| 2008/0197655 A1 | 8/2008 | Oerke et al. |
| 2008/0216973 A1 | 9/2008 | Walter |
| 2009/0045648 A1 | 2/2009 | Hintennach et al. |
| 2009/0145559 A1 | 6/2009 | Glasl et al. |
| 2009/0178771 A1 | 7/2009 | Lin |

FOREIGN PATENT DOCUMENTS

| | | |
|---|---|---|
| DE | 3936410 A1 | 5/1991 |
| DE | 102004028882 A1 | 1/2006 |
| DE | 102004033982 A1 | 2/2006 |
| DE | 10 2005 024 657 A1 | 6/2006 |
| DE | 102005030973 A1 | 1/2007 |
| DE | 102005040758 A1 | 3/2007 |
| DE | 102006062542 A1 | 7/2008 |
| DE | 102007033487 A1 | 1/2009 |
| DE | 102007036652 A1 | 1/2009 |
| DE | 102009017073 A1 | 10/2010 |
| EP | 1953018 A1 | 8/2008 |
| FR | 1379077 A | 11/1964 |
| JP | 61-016527 | 1/1986 |
| JP | 11-141250 | 5/1999 |
| JP | 2008-024266 A | 2/2008 |
| JP | 2008-520859 A | 6/2008 |
| JP | 2008-260516 A | 10/2008 |
| WO | WO-2010022768 A1 | 3/2010 |
| WO | WO-2010022769 A1 | 3/2010 |

OTHER PUBLICATIONS

Notice of Reasons for Rejection for Japanese Application No. 2012-531460, dated Jun. 24, 2013.

* cited by examiner

VEHICLE ROLLER BLIND ARRANGEMENT, SUBASSEMBLY WITH A VEHICLE ROLLER BLIND ARRANGEMENT, AND ROOF ARRANGEMENT

BACKGROUND OF THE INVENTION

1. Field of the Invention

The invention relates to a vehicle roller blind arrangement, to a subassembly with a vehicle roller blind arrangement, and to a roof arrangement.

2. Related Technology

In vehicle roller blind arrangements according to the prior art, the roller blind web can be wound together with a guide element, which is arranged displaceably in the vehicle, to form a roller blind winding which is arranged in a predetermined region in the vehicle. In this case, the diameter of the roller blind winding is dependent in particular on the thickness of the roller blind web. Given a corresponding thickness of the roller blind web, the diameter of the roller blind winding may be very large. Frictional contact may occur between the roller blind web and parts of the vehicle. The frictional forces occurring in the process are in particular highly dependent on the material of the roller blind web and may therefore be relatively large. The forces required for actuating the vehicle roller blind arrangement may therefore be relatively large.

SUMMARY OF THE INVENTION

It is the object of the invention to specify a vehicle roller blind arrangement of the type mentioned at the beginning, a subassembly with a vehicle roller blind arrangement, and a roof arrangement, which enable a simple construction and low cost but nevertheless permit reliable operation of the vehicle roller blind arrangement.

This object is achieved, according to a first aspect of the invention, by a vehicle roller blind arrangement of the type mentioned at the beginning, in which the band element has a T-shaped or Y-shaped cross section, consists of a different material from the roller blind web and has a smaller material thickness than the roller blind web.

The use of a band element has the advantage that the material of the band element can be independent of the material of the roller blind web. Furthermore, the thickness of the band element can be independent of the thickness of the roller blind web. The diameter of the winding consisting of the band element and the guide element is therefore merely dependent on the extension length of the roller blind. Given a small thickness of the band element, the diameter of the winding consisting of the band element and the guide element can be kept small.

In an embodiment according to the invention, the band element has a T-shaped or Y-shaped cross section. By means of the T-shaped or Y-shaped design of the band element, the latter can be arranged in a simple manner on an upper or lower side of the roller blind web and can be connected to the latter, for example, by sewing.

In a first alternative embodiment, the band element has a Y-shaped cross section and the guide element is designed in a band-shaped manner with a first side and a second side facing away from the first side. A first section of the band element is coupled fixedly to the first side of the guide element and a second section of the band element is coupled fixedly to the second side of the guide element. This has the advantage of enabling a secure bond between the band element and the guide element. Furthermore, a particularly thin design of the first and of the second section of the band element is possible, and therefore the band element and the guide element can together have a very small thickness.

In a second alternative embodiment, the band element has a T-shaped cross section and the guide element is designed in a band-shaped manner with a first side and a second side facing away from the first side. A first section of the band element and a second section of the band element are coupled fixedly to the first side of the guide element. This has the advantage of enabling a secure bond between the band element and the guide element. Furthermore, a particularly thin design of the band element and of the guide element is possible. A particularly small diameter of the winding consisting of the band element and the guide element is therefore possible.

In an advantageously developed embodiment, the first longitudinal side of the band element has a tab, and the tab is coupled fixedly either to an upper side or a lower side of the roller blind web. This has the advantage that the diameter of the winding consisting of the band element and of the roller blind web can be kept small given a small thickness of the band element. The band element can be connected to the roller blind web in a simple manner, for example by sewing.

In a further advantageous development, the band element is coupled to the guide element by means of an adhesive connection. This has the advantage of enabling a very simple and secure bond between the band element and the guide element and of making it possible to omit a stitched seam between the band element and the guide element.

According to a second aspect of the invention, a subassembly comprises a vehicle roller blind arrangement according to the first aspect of the invention and a guide rail which can be coupled fixedly to the vehicle and extends along the extension direction. The guide rail has at least one guide section by means of which the guide element is guided, and the guide element has a surface facing the at least one guide section, and a section of the band element is arranged between the at least one guide section and the guide element on that surface of the guide element which faces the at least one guide section. This has the advantage that the band element and the guide element together can have adjustable sliding properties in relation to the guide rail. It may suffice to adjust the frictional properties of the band element and of the guide element once such that said frictional properties can then be identical for all subassemblies having the vehicle roller blind arrangement.

In an advantageous embodiment according to the second aspect of the invention, the guide rail has two laterally spaced-apart guide sections which are arranged in such a manner that each lateral section of the guide element is guided by one of the guide sections, and each section of the band element is arranged between one of the guide sections and one of the lateral sections of the guide element on that surface of the guide element which faces the guide section. This has the advantage that small actuating forces on the vehicle roller blind arrangement are possible, since the guide rail and the guide element have two contact regions lying in a plane. It is possible in a simple manner to avoid tilting of the guide elements. Furthermore, secure guidance during a lateral movement of the guide element is possible.

According to a third aspect of the invention, a vehicle roller blind arrangement has a roller blind web which can be wound or unwound in an extension direction, and a guide element which extends along the extension direction and is guidable in a guide rail, which can be coupled fixedly to the vehicle, and which is designed in a band-shaped manner with a first side and a second side facing away from the first side. The roller blind web is coupled fixedly to just one of the sides of the guide element, and the other of the sides of the guide element has a sliding layer which has a plastic and/or a varnish. This has the advantage of enabling good sliding properties of the bond consisting of the roller blind web and guide element. By attaching the roller blind web on one side, it is possible to save on material for the roller blind web. The diameter of the winding consisting of the roller blind web and the guide element can be kept small. An advantage in terms of construction space is therefore possible. The guide element can be connected to the roller blind web in a simple manner, for example by sewing.

According to a fourth aspect of the invention, a subassembly comprises a vehicle roller blind arrangement according to the third aspect of the invention and a guide rail which can be coupled fixedly to the vehicle and extends along the extension direction. The guide rail has at least one guide section by means of which the guide element is guided, and that side of the guide element which has the sliding layer faces the at least one guide section. This has the advantage of enabling very good sliding properties between the guide rail and the guide element.

According to a fifth aspect of the invention, a vehicle roller blind arrangement has a roller blind web which can be wound or unwound in an extension direction, a guide element which extends along the extension direction and is guidable in a guide rail, which can be coupled fixedly to the vehicle, and which is designed in a band-shaped manner with a first side and a second side facing away from the first side. The roller blind web is coupled fixedly to one of the sides of the guide element in a first surface section. One of the sides of the guide element has, in a second surface section, a sliding layer which contains a plastic and/or a varnish. This has the advantage of enabling good sliding properties of the bond consisting of the roller blind web and guide element. By attaching the roller blind web on one side, it is possible to save on material for the roller blind web. The diameter of the winding consisting of the roller blind web and the guide element can be kept small. An advantage in terms of construction space is therefore possible. The guide element can be connected to the roller blind web in a simple manner, for example by sewing.

According to a sixth aspect of the invention, a subassembly comprises a vehicle roller blind arrangement according to the fifth aspect of the invention and a guide rail which can be coupled fixedly to the vehicle and extends along the extension direction, wherein the guide rail has two laterally spaced-apart guide sections by means of which the guide element is guided, and that side of the guide element to which the roller blind web is coupled fixedly in the first section and which has the sliding layer in the second surface section faces the two laterally spaced-apart guide sections. This has the advantage of making it possible for actuating forces on the vehicle roller blind arrangement to be small, since the guide rail and the guide element have two contact regions lying substantially in a plane. As an alternative, the two contact regions may also lie in two planes offset slightly in relation to each other in order thereby to compensate for differences in thickness between the roller blind web and the sliding layer. Tilting of the guide element can be avoided. Furthermore, secure guidance during a lateral movement of the guide element is possible.

In another advantageous embodiment of the vehicle roller blind arrangement, the guide element contains a metal. This has the advantage that the metal permits a mechanically stable and nevertheless elastic design of the guide element. The guide element may also be entirely composed of metal.

In another advantageous embodiment of the vehicle roller blind arrangement, the guide element is a scroll spring.

In another advantageous embodiment of the vehicle roller blind arrangement, the sliding layer contains polytetrafluoroethylene. This has the advantage that the sliding layer has particularly good sliding properties. The sliding layer may also be entirely composed of polytetrafluoroethylene.

According to a seventh aspect of the invention, a roof arrangement has a roof opening, a roof opening frame which bounds the roof opening, and a subassembly according to the second, fourth or sixth aspect of the invention. The subassembly is arranged in the roof opening and is coupled mechanically to the roof opening frame.

BRIEF DESCRIPTION OF THE DRAWINGS

The invention is explained in more detail below with reference to exemplary embodiments. In the figures.

DETAILED DESCRIPTION

Elements of identical construction or function are identified by the same reference numbers throughout the figures.

Figure 1:
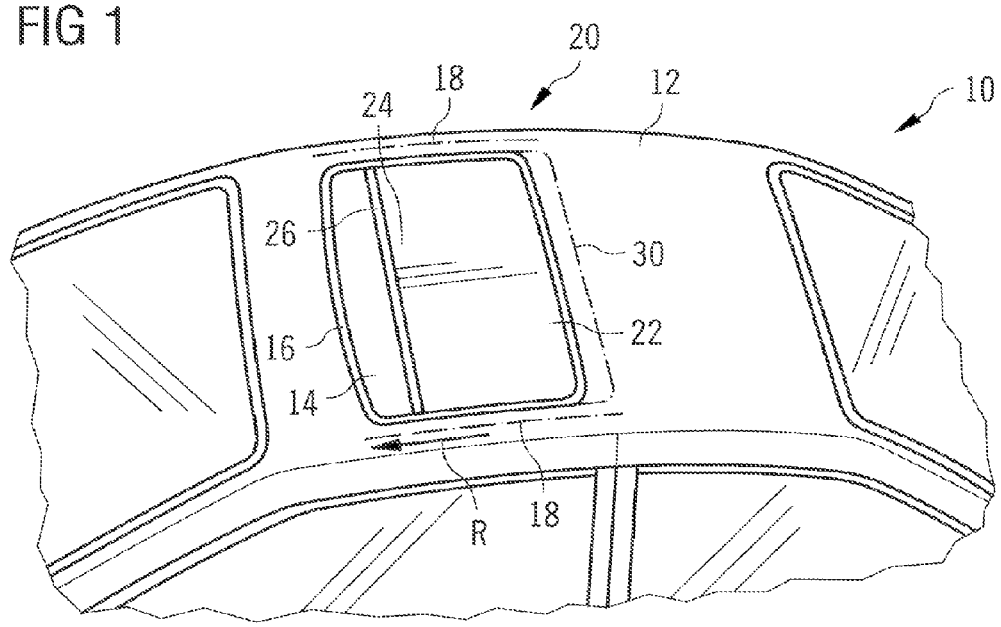
FIG. 1 shows a schematic view of a roof arrangement of a vehicle.

FIG. 1 illustrates a vehicle 10, with a vehicle roof 12 which is provided with a roof opening 14 which is either closed or can be at least partially opened up by means of a displaceable sliding roof cover.

The roof opening 14 is bounded by a roof opening frame 16 formed on the vehicle roof 12. The roof opening frame 16 has guide rails 18 which are preferably arranged on both sides and in which a vehicle roller blind arrangement 20, which is illustrated in detail in FIGS. 2 to 7, is arranged below the displaceable sliding roof cover. Suitable material for the guide rails 18 includes metal, in particular, and preferably aluminum. Alternatively, a plastic is suitable material for the guide rails 18.

The vehicle roller blind arrangement 20 has at least one roller blind web 22 which, with respect to the vehicle 10, can be displaced forward in an extension direction R and rearward in the opposite direction to the extension direction R. If the roller blind web 22 is pushed entirely to the rear, the roof opening 14 is entirely opened up. Sun light and ambient air can then pass without obstruction into the vehicle interior. If, by contrast, the roller blind web 22 is pushed entirely forward, the roof opening 14 is covered by the roller blind web 22 such that direct sunlight and ambient air can only partially pass into the vehicle interior. In further embodiments, the vehicle roller blind arrangement 20 has two or more roller blind webs which can be displaced in the same or opposite direction forward and rearward with respect to the vehicle in order to open up or cover the roof opening 14.

At one end of the roller blind web 22, which end is the rear end of the roller blind web 22 with respect to the longitudinal direction of the vehicle, the roller blind web 22 can be completely wound up, as is illustrated in detail below. At a further end 24 of the roller blind web 22, which end is the front end of the roller blind web 22 with respect to the longitudinal direction of the vehicle, there is a tension bow 26 which the vehicle occupant can actuate, in particular manually, in order thereby to push the roller blind web 22 forward or rearward. The longitudinal edges of the roller blind web 22, i.e. the right and the left edge of the roller blind web 22, are arranged in the guide rails 18, which are arranged at the sides of the roof opening 14. As an alternative, the roller blind web may also be actuated by an electric device.

The guide rails 18 and the vehicle roller blind arrangement 20 together form a subassembly 28 which is described in detail below.

A winding device 30, by means of which the roller blind web 22 can be wound to form a roller blind winding, is arranged in the region of the rear end of the roof opening 14.

Figure 2:
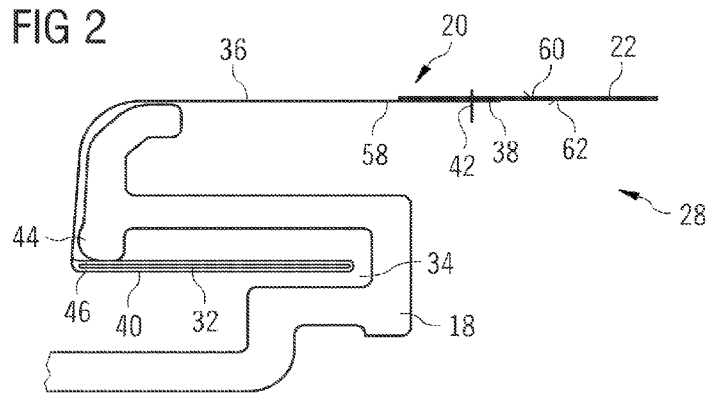
FIG. 2 shows a schematic view of a subassembly with a vehicle roller blind arrangement.

FIG. 2 shows an embodiment of the subassembly 28 with the guide rail 18 and the vehicle roller blind arrangement 20. The vehicle roller blind arrangement 20 comprises a guide element 32 which is arranged in a pocket 34 in the guide rail 18. The guide element 32 extends along the extension direction R within the guide rail 18 and is guidable in the latter. In this case, the plane in which the guide element 32 extends, and the plane in which the roller blind web 22 extends, run substantially parallel to each other.

The vehicle roller blind arrangement 20 furthermore comprises a band element 36 which likewise extends along the extension direction R. The band element 36 is preferably a textile band element. The band element 36 is arranged between the roller blind web 22 and the guide element 32. The band element 36 has a first longitudinal side 38 and a second longitudinal side 40. The first longitudinal side 38 is coupled fixedly to the roller blind web 22. The band element 36 is preferably connected to the roller blind web 22 by a stitched seam 42. The band element 36 is of tubular design on the second longitudinal side 40. The guide element 32 is arranged in a cavity in the tubular band element 36. The band element 36 is preferably coupled to the guide element 32 by means of an adhesive connection. The band element 36 is preferably produced together with the guide element 32 in a common extrusion process.

Since the thickness of the band element 36 can be selected independently of the thickness of the roller blind web 22, the diameter of a winding of the band element 36 and of the guide element 32 is independent of the thickness of the roller blind web 22 and merely dependent on the extension length of the roller blind web 22. If the band element 36 is formed with a small thickness, the winding diameter consisting of the band element 36 and the guide element 32 can be kept very small.

The guide rail 18 has a guide section 44 with which the guide element 32 can be guided. A section 46 of the band element 36 is arranged between the guide section 44 and the guide element 32. The band element 36 and the guide element 32 can be selected in such a manner that the sliding properties of said two elements 32, 36 in relation to the guide rail 18 only have to be defined once, and do not undergo any further change, even if a different material is used for the roller blind web 22.

Figure 3:
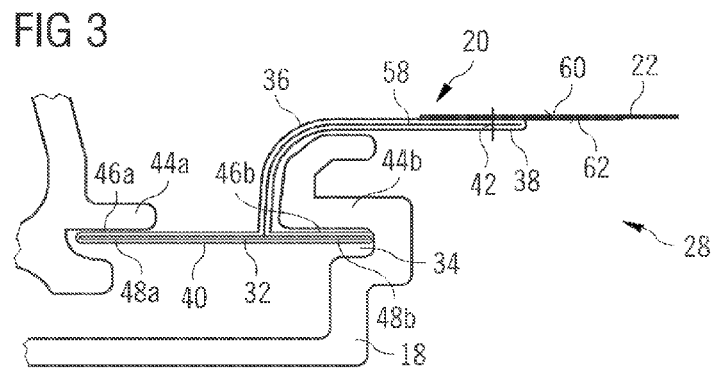
FIG. 3 shows a schematic view of a further subassembly with a vehicle roller blind arrangement.

In the embodiment of the subassembly 28 that is illustrated in FIG. 3, the guide rail 18 has two laterally spaced-apart guide sections 44a, 44b. The guide element 32 has two lateral sections 48a, 48b, each of which is respectively guided by one of the guide sections 44a, 44b. Each section 46a, 46b of the band element 36 is arranged between one of the guide sections 44a, 44b and one of the lateral sections 48a, 48b of the guide element 32. Since the guide sections 44a, 44b of the guide rail 18 lie in a plane, the actuating forces on the vehicle roller blind arrangement 20 can be kept small. The sections 48a, 48b of the guide element 32 can readily bear against the guide sections 44a, 44b of the guide rail 18 via the corresponding sections 46a, 46b of the band element 36, and therefore tilting of the guide element 32 in the pocket 34 of the guide rail 18 can be avoided. Overall, secure guidance of the guide element 32 in the pocket 34 is possible, even during lateral movement of the guide element 32. Furthermore, such a bond between the band element 36 and the guide element 34 has a high degree of elasticity.

Figure 4:
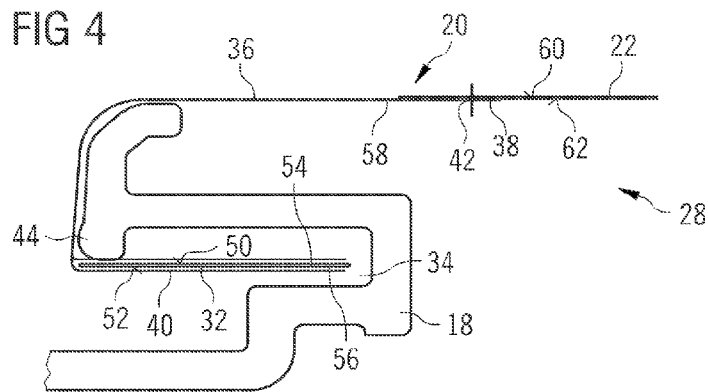
FIG. 4 shows a schematic view of a further subassembly with a vehicle roller blind arrangement.

In a further embodiment of the subassembly 28 that is shown in FIG. 4, the band element 34 has a Y-shaped cross section. The guide element 32 is designed in a band-shaped manner with a first side 50 and a second side 52. The second side 52 faces away from the first side 50. A first section 54 of the band element 36 is coupled fixedly to the first side 50 of the guide element 32. A second section 56 of the band element 36 is coupled fixedly to the second side 52 of the guide element 32. The sections 54, 56 of the band element 36 are preferably coupled to the guide element 32 by means of adhesive connections. This provides a secure bond between the band element 36 and the guide element 32. Furthermore, a particularly thin design of the first and second sections 54, 56 of the band element 36 can be achieved, which, in turn, can result in a small winding diameter of the bond between the guide element 32 and the band element 36. The band element 36 is preferably produced together with the guide element 32 in a common extrusion process. In this exemplary embodiment too, the plane in which the guide element 32 extends, and the plane in which the roller blind web 22 extends, run substantially parallel to each other.

Figure 5:
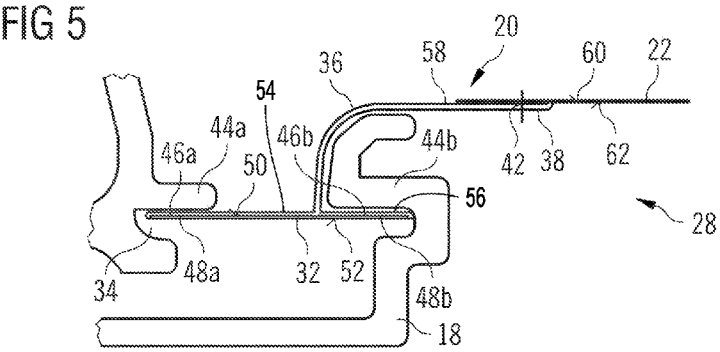
FIG. 5 shows a schematic view of a further subassembly with a vehicle roller blind arrangement.

In a further embodiment of the subassembly 28 that is shown in FIG. 5, the band element 36 is of T-shaped design with the two sections 54, 56. The guide element 32 is designed in a band-shaped manner with the first side 50 and the second side 52. The first section 54 of the band element 36 and the second section 56 of the band element 36 are coupled fixedly to the first side 50 of the guide element 32. The coupling between the band element 36 and the guide element 32 is preferably undertaken by means of an adhesive connection, thus permitting a secure bond between the band element 36 and the guide element 32. Such a bond between the band element 36 and the guide element 34 has a high degree of elasticity. Since the band element 36 is arranged only on one side of the guide element 32, a particularly thin design of the bond between the band element 36 and the guide element 32 is possible. A particularly small diameter of the angle between the band element 36 and the guide element 32 is therefore possible. Since the lateral sections 48a, 48b of the guide element 32 are each respectively guided by one of the laterally spaced-apart guide sections 44a, 44b of the guide rail 18, particularly good guidance of the guide element 32 on the guide rail 18 is possible. Tilting of the guide element 32 in the pocket 34 in the guide rail 18 can thus be particularly readily prevented. Furthermore, secure guidance of the guide element 32 in the pocket 34 during lateral movement of the guide element 32 is possible. By means of the two laterally spaced-apart guide sections 44a, 44b of the guide rail 18, a short overall length of the subassembly 28 transversely with respect to the longitudinal direction of the vehicle can be achieved. Overall, an advantage in terms of construction space both with regard to the width and the diameter of the subassembly 28 is therefore provided. In this exemplary embodiment too, the plane in which the guide element 32 extends, and the plane in which the roller blind web 22 extends run substantially parallel to each other.

In the embodiments of the subassembly 28 that are shown in FIGS. 2 to 5, the first longitudinal side 38 of the band element 36 in each case has a tab 58. The roller blind web 22 has an upper side 60 and a lower side 62. The tab 58 is arranged on the lower side 62 of the roller blind web 22 and is coupled fixedly thereto. In alternative embodiments, the tab 58 can also be coupled fixedly to the upper side 60 of the roller blind web 22. By the tab 58 being connected either to the upper side 60 or to the lower side 62, the diameter of the winding consisting of the band element 36 and the roller blind web 22 can be kept small. Furthermore, the band element 36 can be connected to the roller blind web 22 in a simple manner, for example by the stitched seam 42.

Figure 6:
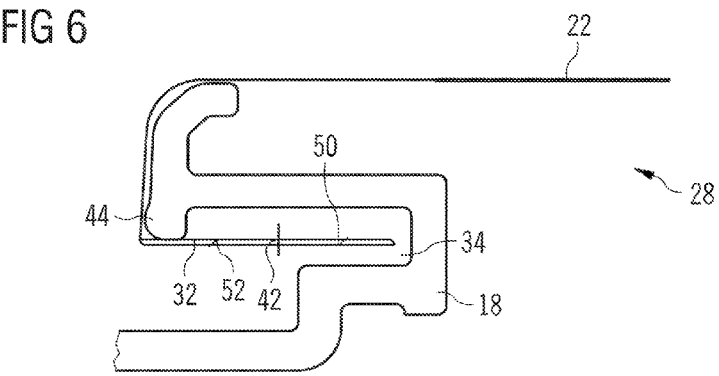
FIG. 6 shows a schematic view of a further subassembly with a vehicle roller blind arrangement.

In the further embodiment of the subassembly 28 that is shown in FIG. 6, the roller blind web 22 is coupled directly to the second side 52 of the guide element 32. The first side 50 of the guide element 32 has a sliding layer. The sliding layer contains a plastic and/or a varnish, it also being possible for the sliding layer to be entirely composed of a plastic and/or a varnish. The sliding layer preferably contains polytetrafluoroethylene, it being possible for the sliding layer also to be entirely composed of polytetrafluoroethylene. Particularly good sliding properties of the bond between the roller blind web 22 and the guide element 32 are therefore possible. By means of the attachment of the roller blind web 22 on one side of the guide element 32, it is possible to save on material for the roller blind web 22. Owing to the arrangement of the roller blind web 22 on one side of the guide element 32, the diameter of the winding consisting of the roller blind web 22 and the guide element 32 can be kept small. A considerable advantage in terms of construction space is therefore possible. The guide element 32 can be connected to the roller blind web 22 in a simple manner, for example by the stitched seam 42. The guide section 44 permits guidance of the guide element 32. The first side 50 of the guide element 32, which side faces the guide section 44 of the guide rail 18 and which is provided with the sliding layer, permits very good sliding properties between the guide rail 18 and the guide element 32. In this exemplary embodiment too, the plane in which the guide element 32 extends, and the plane in which the roller blind web 22 extends run substantially parallel to each other.

Figure 7:
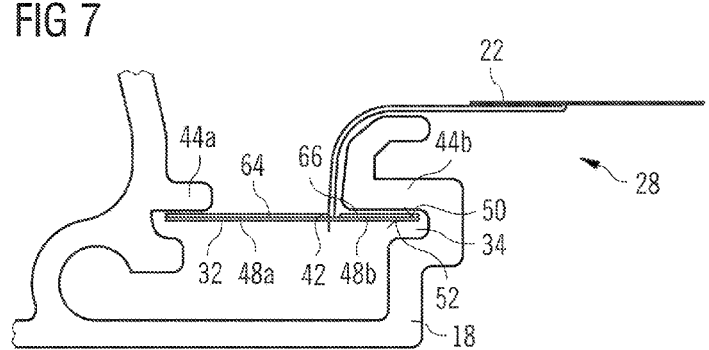
FIG. 7 shows a schematic view of a further subassembly with a vehicle roller blind arrangement.

In the further embodiment of the subassembly 28 that is shown in FIG. 7, the roller blind web 22 is coupled in a first surface section 64 to the first side 50 of the guide element 32. The first side 50 of the guide element 32 has a sliding layer in a second surface section 66. The sliding layer contains a plastic and/or a varnish, it also being possible for the sliding layer to be entirely composed of a plastic and/or a varnish. The sliding layer preferably contains polytetrafluoroethylene, it also being possible for the sliding layer to be entirely composed of polytetrafluoroethylene. The first side 50 of the guide element 32, to which side the roller blind web 22 is coupled fixedly in the first surface section 64 and which has the sliding layer in the second surface section 66, faces the two laterally spaced-apart guide sections 44a, 44b of the guide rail 18. It is therefore possible for the sliding friction between the bond between the roller blind 22 and the guide element 32 to be very low. It is therefore possible for actuating forces on the vehicle roller blind arrangement 20 to be low, since the guide rail 18 and the guide element 32 can have two contact regions lying in a plane, or, alternatively, can also lie in two slightly offset planes in order thereby to compensate for differences in thickness between the roller blind web 22 and the sliding layer. Tilting of the guide element 32 in the pocket 34 of the guide rail 18 can therefore be avoided, and reliable guidance of the guide element 32 is possible. By attaching the roller blind web 22 on one side to the guide element 32, it is possible to save on material for the roller blind web 22. Furthermore, the diameter of the winding consisting of the roller blind web 22 and the guide element 32 can be kept small. By means of the two laterally spaced-apart guide sections 44a, 44b of the guide rail 18, it is possible to achieve a short overall length of the subassembly 28 transversely with respect to the longitudinal direction of the vehicle. Overall, therefore, an advantage in terms of construction space both with regard to the width and the diameter of the subassembly 28 is provided. The guide element 32 is connected to the roller blind web 22 in a simple manner by the stitched seam 42. In this exemplary embodiment too, the plane in which the guide element 32 extends, and the plane in which the roller blind web 22 extends run substantially parallel to each other.

The illustrated embodiments of the subassembly 28 consisting of the vehicle roller blind arrangement 20 and the guide rail 18 make it possible for the guide rail 18 to be composed of a metal. Since the bond between the band element 36 and the guide element 34 and between the roller blind web 22 and the guide element 34 can have a high degree of elasticity, the use of a plastic for the guide rail 18 can be dispensed with.

All of the described embodiments of the invention involve in particular the arrangement of the vehicle roller blind arrangement in an openable vehicle roof. The vehicle roller blind arrangement according to the invention can also be used for openings in doors or in the front, side or rear region of vehicles. The roller blind webs do not necessarily serve to protect against the sun. For example, it is advantageously also possible for protective grills against mosquitoes to be actuated by the described arrangement.

The invention is not limited to the exemplary embodiments indicated. It is possible in particular to combine the features of the various exemplary embodiments with one another, and therefore arrangements of this type are also covered by the invention.

The invention claimed is:

1. A vehicle roller blind arrangement, comprising:
   a roller blind web that can be wound or unwound in an extension direction,
   a band-shaped guide element that extends along the extension direction and is guidable in a guide rail that can be fixedly coupled to a vehicle in such a manner that said guide element extends parallel to the roller blind web, and
   a band element that extends along the extension direction and is arranged between the roller blind web and the guide element and, on a first longitudinal side, is fixedly coupled to the roller blind web and, on a second longitudinal side, is fixedly coupled to the guide element, wherein the band element is composed of a different material from the roller blind web, and has a smaller material thickness than the roller blind web;
   wherein the guide element comprises a first side and a second side facing away from the first side, and a first section of the band element and a second section of the band element are fixedly coupled to the first side of the guide element, each of the first section and the second section comprising a free end.

2. The vehicle roller blind arrangement according to claim 1, wherein the band element is coupled to the guide element by an adhesive connection.

3. The vehicle roller blind arrangement according to claim 1, wherein the band element is a textile band element.

4. The vehicle roller blind arrangement according to claim 1, wherein the guide element contains a metal.

5. A subassembly comprising a vehicle roller blind arrangement according to claim 1 and a guide rail that can be coupled fixedly to the vehicle and extends along the extension direction, wherein the guide rail has at least one guide section by which the guide element is guided, and the guide element has a surface facing the at least one guide section, and a section of the band element is arranged between the at least one guide section and the guide element on that surface of the guide element that faces the at least one guide section.

6. The subassembly according to claim 5, wherein the guide rail has two guide sections that are spaced apart laterally from each other and are arranged in such a manner that each lateral section of the guide element is respectively guided by one of the guide sections, and each section of the band element is arranged between one of the guide sections and one of the lateral sections of the guide element on that surface of the guide element that faces the guide section.

* * * * *

UNITED STATES PATENT AND TRADEMARK OFFICE
CERTIFICATE OF CORRECTION

PATENT NO. : 8,690,234 B2  
APPLICATION NO. : 13/320892  
DATED : April 8, 2014  
INVENTOR(S) : Andreas Rockelmann et al.

Page 1 of 1

It is certified that error appears in the above-identified patent and that said Letters Patent is hereby corrected as shown below:

On the Title Page:

At item (75), eighth named Inventor, Wienlenbach (DE) should be -- Wielenbach (DE) --.

Signed and Sealed this  
Seventeenth Day of June, 2014

Michelle K. Lee  
*Deputy Director of the United States Patent and Trademark Office*